(12) United States Patent
Nagatsu et al.

(10) Patent No.: US 9,650,984 B2
(45) Date of Patent: May 16, 2017

(54) CONTROL SYSTEM FOR GASOLINE ENGINE

(75) Inventors: Kazuhiro Nagatsu, Hiroshima (JP); Masatoshi Hidaka, Higasihiroshima (JP); Takashi Kaminaga, Hatsukaichi (JP); Masahisa Yamakawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 673 days.

(21) Appl. No.: 13/634,796

(22) PCT Filed: Mar. 30, 2011

(86) PCT No.: PCT/JP2011/001893
§ 371 (c)(1),
(2), (4) Date: Sep. 13, 2012

(87) PCT Pub. No.: WO2011/122015
PCT Pub. Date: Oct. 6, 2011

(65) Prior Publication Data
US 2013/0008416 A1    Jan. 10, 2013

(30) Foreign Application Priority Data
Mar. 31, 2010 (JP) .................... 2010-082554

(51) Int. Cl.
*F02D 41/30* (2006.01)
*F02D 13/02* (2006.01)
(Continued)

(52) U.S. Cl.
CPC ..... *F02D 41/3035* (2013.01); *F02D 13/0265* (2013.01); *F02D 41/0245* (2013.01);
(Continued)

(58) Field of Classification Search
CPC .. F02D 41/029; F02D 41/405; F02D 41/3035; F02D 41/0245; F02D 13/0265; Y02T 10/47; F01N 9/002
(Continued)

(56) References Cited

U.S. PATENT DOCUMENTS 5,839,275 A    11/1998 Hirota et al.
6,276,130 B1    8/2001 Ito et al.
(Continued)

FOREIGN PATENT DOCUMENTS

CN    1460149 A    12/2003
CN    1576530 A    2/2005
(Continued)

OTHER PUBLICATIONS

International Search Report; PCT/JP2011/001893; Jun. 7, 2011.
(Continued)

*Primary Examiner* — Sizo Vilakazi
(74) *Attorney, Agent, or Firm* — Studebaker & Brackett PC

(57) ABSTRACT

When a specific condition requiring a rise in exhaust gas temperature is satisfied, a required fuel amount to be injected from an injector (21) is injected in a split manner, such that the fuel injection is divided to: a main injection (X1) to be initiated a given period before a compression top dead center; an auxiliary injection (X2) to be initiated after initiation of auto-ignited combustion of an air-fuel mixture consisting of air and the fuel injected by the main injection (X1) and before an assumed peak timing (Pk') of a heat release rate (RH) from the combustion based on the main injection (X1); and a post injection (X3) to be initiated after the assumed peak timing (Pk') and before completion of combustion based on the main injection (X1) and the auxiliary injection (X2). This makes it possible to raise an (Continued)

exhaust gas temperature while sufficiently ensuring auto-ignitability and fuel economy performance.

7 Claims, 8 Drawing Sheets

(51) Int. Cl.
| | |
|---|---|
| *F02D 41/02* | (2006.01) |
| *F02D 41/40* | (2006.01) |
| *F02D 41/00* | (2006.01) |
| *F02D 41/14* | (2006.01) |

(52) U.S. Cl.
CPC .......... *F02D 41/405* (2013.01); *F02D 41/006* (2013.01); *F02D 41/1446* (2013.01); *F02D 2041/001* (2013.01); *Y02T 10/128* (2013.01); *Y02T 10/18* (2013.01); *Y02T 10/26* (2013.01); *Y02T 10/44* (2013.01)

(58) Field of Classification Search
USPC ...... 60/278; 123/299, 568.11–568.32, 179.4, 123/198 DB, 325, 326; 701/112
See application file for complete search history.

(56) References Cited

U.S. PATENT DOCUMENTS

| | | | |
|---|---|---|---|
| 7,290,524 | B2 | 11/2007 | Kobayashi |
| 7,520,260 | B2 | 4/2009 | Nakamura et al. |
| 2005/0039439 | A1 | 2/2005 | Kitahara |
| 2005/0039440 | A1 | 2/2005 | Kitahara |
| 2005/0039442 | A1 | 2/2005 | Ishibashi et al. |
| 2005/0039443 | A1* | 2/2005 | Kitahara .................. 60/285 |
| 2005/0061295 | A1* | 3/2005 | Minato .................. 123/406.45 |
| 2006/0225693 | A1 | 10/2006 | Brachert et al. |
| 2007/0006842 | A1 | 1/2007 | Kesse et al. |
| 2007/0074702 | A1* | 4/2007 | Nakamura et al. ........... 123/299 |
| 2007/0107680 | A1* | 5/2007 | Kobayashi .................. 123/58.8 |
| 2008/0295798 | A1 | 12/2008 | Reitz et al. |
| 2009/0164100 | A1 | 6/2009 | Ostberg et al. |
| 2010/0006078 | A1* | 1/2010 | Shoda .......................... 123/676 |
| 2010/0242900 | A1* | 9/2010 | Hitomi ................. F02D 35/023 123/299 |
| 2011/0067679 | A1* | 3/2011 | Hitomi ............... F02D 41/3035 123/564 |

FOREIGN PATENT DOCUMENTS

| | | | | |
|---|---|---|---|---|
| CN | 101463768 A | | 6/2009 | |
| EP | 0831226 A2 | | 3/1998 | |
| EP | 1026385 A2 | | 8/2000 | |
| EP | 1496235 A2 | | 1/2005 | |
| EP | 1496235 A3 | | 11/2005 | |
| FR | 2899283 A1 | | 10/2007 | |
| JP | 2000-130212 A | | 5/2000 | |
| JP | 2003-286885 A | | 10/2003 | |
| JP | 2003286885 A | * | 10/2003 | ............. F02D 41/40 |
| JP | 2007-092724 A | | 4/2007 | |
| JP | 2007-132319 A | | 5/2007 | |
| JP | 2010-048212 A | | 3/2010 | |
| WO | 01/59285 A2 | | 8/2001 | |
| WO | 01/59285 A3 | | 8/2001 | |

OTHER PUBLICATIONS

The first Office Action issued by the Chinese Patent Office on Sep. 2, 2014, which corresponds to Chinese Patent Application No. 201180014003.5 and is related to U.S. Appl. No. 13/634,796; with English language summary.

The Second Office Action issued by the Chinese Patent Office on Apr. 30, 2015, which corresponds to Chinese Patent Application No. 201180014003.5 and is related to U.S. Appl. No. 13/634,796; with English language summary.

The extended European search report issued by the European Patent Office on May 9, 2016, which corresponds to European Patent Application No. 11762258.9-1603 and is related to U.S. Appl. No. 13/634,796.

* cited by examiner

CONTROL SYSTEM FOR GASOLINE ENGINE

TECHNICAL FIELD

The present invention relates to a system for controlling a gasoline engine which is provided with an injector for injecting fuel at least partially consisting of gasoline, into a cylinder, and designed such that homogeneous-charge compression ignition (HCCI) combustion, in which an air-fuel mixture consisting of air and the fuel injected from the injector is compressed by a piston and auto-ignited, is performed in an HCCI region including at least a partial-load range of the engine, and internal EGR is performed in a part of the HCCI region on a low engine load side.

BACKGROUND ART

Heretofore, in the field of gasoline engines, a combustion mode where an air-fuel mixture is forcibly ignited by a spark discharge from a spark plug (spark ignition (SI) combustion) has been commonly employed. Recent years, researches for applying so-called "homogeneous-charge compression ignition (HCCI) combustion" to gasoline engines in place of the SI combustion have been conducted. For example, as a document related thereto, there is JP 2007-132319A (hereinafter referred to as "Patent Document 1"). The HCCI combustion is a combustion mode in which an air-fuel mixture formed in a cylinder (combustion chamber) of a gasoline engine, is auto-ignited without relying on spark ignition, under a high-temperature/high-pressure environment created by compressing the air-fuel mixture by a piston. In the HCCI combustion, auto-ignition occurs simultaneously at many positions in the cylinder. Thus, and it is said that the HCCI combustion has a shorter combustion period and thereby achieves higher thermal efficiency, as compared with the SI combustion.

However, in the HCCI combustion, due to the shorter combustion period and the higher thermal efficiency, energy to be discharged outside as heat (exhaust loss) becomes smaller, so that an exhaust gas temperature is apt to become lower, as compared with the SI combustion. Thus, there is concern that an exhaust gas-purifying catalyst provided in an exhaust passage fails to sufficiently function.

Specifically, generally, a catalyst comprised, for example, of a three-way catalyst, is provided in an exhaust passage of a gasoline engine. As a prerequisite to allowing the catalyst to sufficiently exert purification performance, it is necessary to maintain a catalyst temperature at a value higher than a certain level. However, in cases where the gasoline engine is operated in the HCCI combustion mode where the exhaust gas temperature is likely to become lower, the catalyst temperature is also likely to become lower than a catalyst activation temperature, which causes a risk that the catalyst fails to sufficiently function.

Meanwhile, in the field of spark-ignition gasoline engines, there has been known a technique of injecting additional fuel during an expansion stroke to achieve a rise in catalyst temperature. For example, JP 2000-130212A (hereinafter referred to as "Patent Document 2") discloses a spark-ignition gasoline engine designed to perform a so-called "stratified lean combustion mode" in which fuel (gasoline) is injected into a cylinder in a later phase of a compression stroke in such a manner as to form a rich air-fuel mixture locally around a spark plug to achieve a significantly lean air/fuel ratio in the cylinder as a whole, and then forcibly ignite the air-fuel mixture by the spark plug. The Patent Document 2 also discloses a technique of, after the fuel injection during the compression stroke, performing an additional fuel injection during a subsequent expansion stroke to induce an oxidization reaction of additionally-injected fuel in an exhaust passage, etc., so as to raise an exhaust gas temperature and thus a temperature of a catalyst (in the Patent Document 2, NOx catalyst) in the exhaust passage to facilitate performance recovery of the catalyst.

However, the above technique in the Patent Document 2, i.e., a multi-stage fuel injection for raising the exhaust gas temperature, is based on a spark-ignition lean-burn engine, but it does not assume a gasoline engine to be operated in the HCCI combustion mode. Considering that the HCCI combustion mode and the SI combustion mode are totally different in combustion mechanism, even if the multi-stage fuel injection disclosed in the Patent Document 2 is applied to an HCCI engine without modifications, auto-ignitability of an air-fuel mixture is liable to deteriorate, which causes a problem such as misfire, or an amount of fuel to be discharged outside without being combusted in a cylinder (unburned fuel) is liable to increase, which causes significant deterioration in fuel economy.

SUMMARY OF THE INVENTION

In view of the above circumstances, it is an object of the present invention to, in a gasoline engine designed to perform HCCI combustion at least in a partial-load range, effectively raise an exhaust gas temperature while sufficiently ensuring auto-ignitability and fuel economy performance.

A gasoline engine employing a gasoline engine control system of the present invention is provided with an injector for injecting fuel at least partially consisting of gasoline, into a cylinder, and designed such that homogeneous-charge compression ignition (HCCI) combustion, in which an air-fuel mixture consisting of air and the fuel injected from the injector is compressed by a piston and auto-ignited, is performed in an HCCI region including at least a partial-load range of the engine, and internal EGR is performed in a part of the HCCI region on a low engine load side. The gasoline engine control system comprises an injector controller adapted to control an injection amount and an injection timing of the fuel from the injector, wherein the injector controller is operable, when a specific condition requiring a rise in exhaust gas temperature is satisfied during an engine operation in the HCCI region, to inject a required fuel amount to be injected from the injector in a split manner, such that the fuel injection is divided to: a main injection to be initiated a given period before a compression top dead center; an auxiliary injection to be initiated after initiation of auto-ignited combustion of an air-fuel mixture consisting of air and the fuel injected by the main injection and before an assumed peak timing of a heat release rate from the combustion based on the main injection; and a post injection to be initiated after the assumed peak timing and before completion of combustion based on the main injection and the auxiliary injection.

DESCRIPTION OF EMBODIMENTS (1) Overall Structure of Engine

Figure 1:
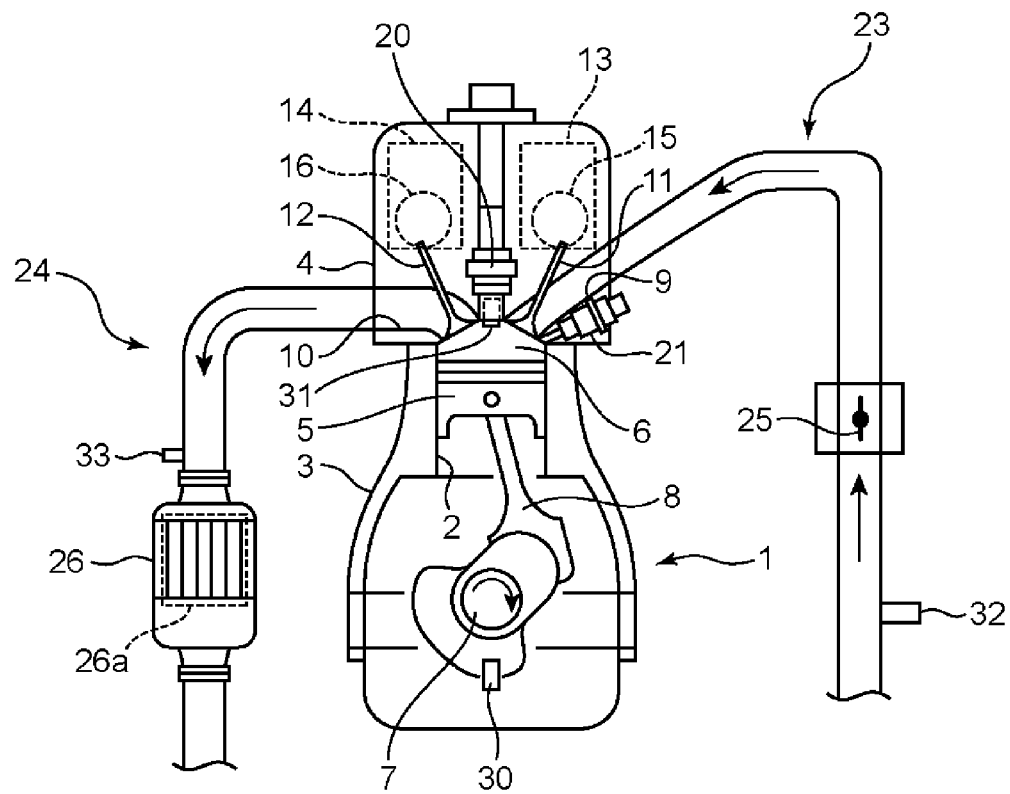
FIG. 1 is a schematic diagram showing an overall structure of a gasoline engine employing a control system according to one embodiment of the present invention.

FIG. 1 is a schematic diagram showing an overall structure of an engine employing a control system according to one embodiment of the present invention. The engine illustrated in FIG. 1 is a reciprocating-piston type multicylinder gasoline engine to be mounted as a power source for driving of vehicle running. An engine body 1 of the engine comprises a cylinder block 3 having a plurality of cylinders 2 arranged side-by-side in a direction perpendicular to a surface of the drawing sheet (In FIG. 1, only one of the cylinders 2 is illustrated), a cylinder head 4 provided on an upper surface of the cylinder block 3, and a plurality of pistons 5 each inserted in a perspective one of the cylinders 2 in a reciprocatingly slidable manner. Fuel to be supplied to the engine body 1 may be any type consisting mainly of gasoline. For example, the fuel may consist only of gasoline, or may comprise gasoline and ethanol (ethyl alcohol) or the like contained in the gasoline.

Each of the pistons 5 is connected to a crankshaft 7 through a respective one of a plurality of connecting rods 8, in such a manner that the crankshaft 7 is rotated about its central axis according to a reciprocating movement of the piston 5.

The cylinder block 3 is provided with an engine speed sensor 30 for detecting a rotation speed of the crankshaft 7, as an engine speed.

In each of the cylinders 2, a combustion chamber 6 is defined above the piston 5, and the cylinder head 4 is formed with an intake port 9 and an exhaust port 10 each opened to the combustion chamber 6, and provided with an intake valve 11 and an exhaust valve 12 adapted to open and close respective ones of the intake and exhaust ports 9, 10. The illustrated engine is a so-called "double overhead camshaft (DOHC) engine", wherein a pair of the intake valves 11 and a pair of exhaust valves 12 are provided in each of the cylinders 2 (see FIG. 2).

Two valve operating mechanisms 13, 14 each including a respective one of a pair of camshafts (illustration is omitted) is installed in the cylinder head 4, in such a manner that the valve operating mechanism 13 drivingly opens and closes the intake valves 11, and the valve operating mechanism 14 drivingly opens and closes the exhaust valves 12, in conjunction with the rotation of the crankshaft 7.

A CVVL mechanism 15 is incorporated in the valve operating mechanism 13 for the intake valves 11. The CVVL mechanism 15 stands for "Continuous Variable Valve Lift mechanism" which is adapted to be capable of continuously (steplessly) changing a lift amount (valve-lift amount) of each of the intake valves 11. The CVVL mechanism 15 is provided in a manner capable of changing respective lift amounts of all of the intake valves 11 of the engine. Thus, the CVVL mechanism 15 is operable, when it is driven, to simultaneously change respective lift amounts of the pair of intake valves 11 in each of the cylinders 2.

This type of CVVL mechanism has already been publicly known, and a specific structure thereof is disclosed, for example, in JP 2007-85241A (in this document, it is referred to as VVE").

A VVL mechanism 16 is incorporated in the valve operating mechanism 14 for the exhaust valves 14. The VVL mechanism 16 stands for "Variable Valve Lift mechanism" which is an on/off type adapted to selectively activate and deactivate a function of pushing down each of the exhaust valves 12 during an intake stroke. Specifically, the VVL mechanism 16 has a function of allowing the exhaust valve 12 to be opened both during an exhaust stroke and during the intake stroke and switching between execution and stopping of a valve-opening operation of the exhaust valve 12 during the intake stroke.

The on/off type VVL mechanism 16 is provided in association with all of the exhaust valves 12 of the engine, and adapted, with respect to the pair of the exhaust valves 12 in each of the cylinders 2, to selectively execute and stop the valve-opening operation of a respective one of the pair of the exhaust valves 12 during the intake stroke, independently.

For example, the above function of the VVL mechanism 16 may be achieved by providing a sub-cam for pushing down the exhaust valve 12 during the intake stroke in addition to a normal cam for driving the exhaust valve 12 (i.e., a cam for pushing down the exhaust valve 12 during the exhaust stroke), and a so-called lost motion mechanism for cancelling a driving force of the sub-cam to be transmitted to the exhaust valve 12, in such a manner that they are associated with each of the exhaust valves 12, independently. This type of VVL mechanism has already been publicly known, and a specific structure thereof is disclosed, for example, in the JP 2007-85241A (in this document, it is referred to as "valve-operation switching mechanism").

Figure 2:
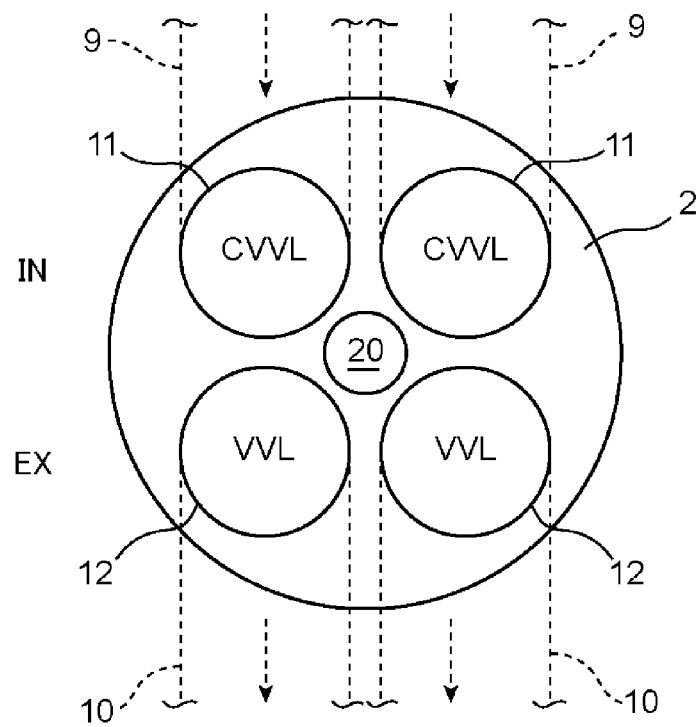
FIG. 2 is a schematic diagram showing a type of variable mechanism associated with intake and exhaust valves of the engine.

FIG. 2 collectively shows types of variable mechanisms associated with the intake and exhaust valves 11, 12. As mentioned above, in this embodiment, in each of the cylinders 2, both of the pair of intake valves 11 are associated with the CVVL mechanism 15 capable of continuously changing the valve-lift amount, and both of the pair of the exhaust valves 12 are associated with the on/off type VVL mechanism 16 adapted to selectively execute and stop the valve-opening operation during the intake stroke.

Returning to FIG. 1, the cylinder head 4 of the engine body 1 is provided with a spark plug 20 and an injector 21 in pairs for each of the cylinders 2.

The injector 21 is provided to be exposed to the combustion chamber 6 from a lateral side of an intake-side region thereof, and adapted to receive fuel (which consists mainly of gasoline) from a non-illustrated fuel supply pipe, and inject the fuel from a distal end thereof into the combustion chamber 6.

The spark plug 20 is provided to be exposed to the combustion chamber 6 from thereabove, and adapted to generate a spark discharge at a distal end thereof in response to power feeding from a non-illustrated ignition circuit.

The cylinder head 4 has a plurality of in-cylinder pressure sensors 31 each provided at a given position adjacent to a respective one of the spark plugs 20 to detect an internal pressure (in-cylinder pressure) of a corresponding one of the cylinders 2.

An intake passage 23 and an exhaust passage 24 are connected to respective ones of a group of the intake ports 9 and a group of the exhaust ports 10 of the engine body 1. Specifically, external intake air (flesh air) is supplied to the combustion chamber 6 via the intake passage 23, and burned gas (exhaust gas) produced in the combustion chamber 6 is discharged to an outside of the engine via the exhaust passage 24.

The intake passage 23 is provided with a throttle valve 25 serving as a flow-rate control valve, and an airflow sensor 32 for detecting a flow rate of intake air passing through the intake passage 23. The throttle valve 25 is comprised of an electronically-controlled throttle valve which is adapted to be selectively openable and closable independently of an angle of a non-illustrated accelerator pedal to be operated (depressed) by a driver.

The exhaust passage 24 is provided with a catalytic converter 26 for purifying exhaust gas, and an exhaust gas temperature sensor 33 for detecting a temperature of exhaust gas passing through an upstream side of the catalytic converter 26. The catalytic converter 26 houses a catalyst 26a comprised of a three-way catalyst to purify harmful components (NOx, CO, HC) contained in exhaust gas passing through the exhaust passage 24 by an action of the catalyst 26a.

(2) Control System

Figure 3:
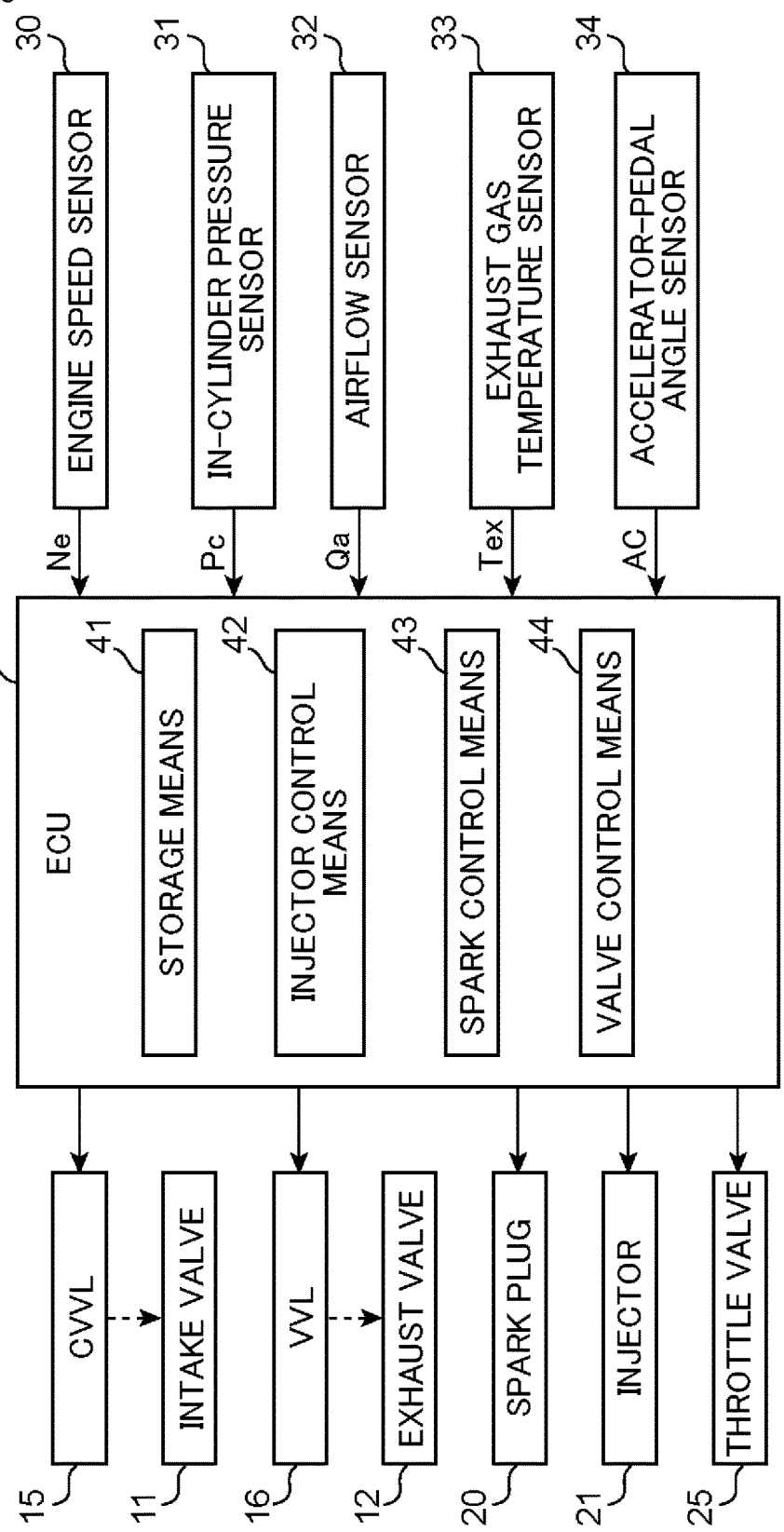
FIG. 3 is a block diagram showing the control system of the engine.

FIG. 3 is a block diagram showing a control system of the engine. An ECU 40 illustrated in FIG. 3 is a device for comprehensively controlling various sections of the engine, and comprised of conventional components, such as a CPU, a ROM and a RAM.

Detection information from various sensors are input into the ECU 40. Specifically, the ECU 40 is electrically connected to each of: a plurality of sensors provided at respective positions of the engine, such as the engine speed sensor 30, the in-cylinder pressure sensor 31, the airflow sensor 32 and the exhaust gas temperature sensor 33; and an accelerator-pedal angle sensor 34 for detecting the angle of the non-illustrated accelerator pedal, and adapted to successively receive an input of detection information, such as an engine speed Ne, an in-cylinder pressure Pc, an intake air amount Qa, an exhaust gas temperature Tex and an accelerator pedal angle AC from respective ones of the sensors 30 to 34, in the form of an electric signal.

Further, the ECU 40 is electrically connected to each of the CVVL mechanism 15, the VVL mechanism 16, the spark plug 20, the injector 21 and the throttle valve 25, and adapted to output a driving control signal to each of these components.

Specific functions of the ECU 40 will be described below. As major functional elements, the ECU 40 has storage means 41, injector control means (injector controller) 42, spark control means 43, and valve control means 44.

Figure 4:
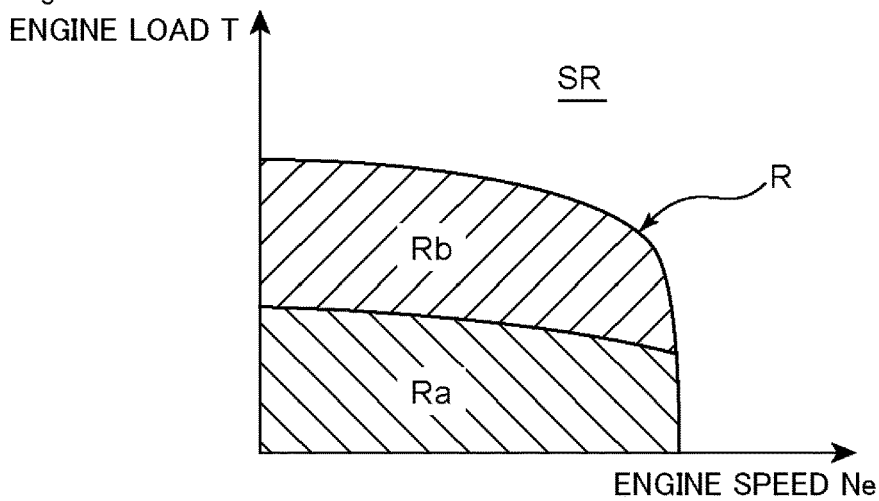
FIG. 4 is a chart showing one example of an engine operating region map used in the control system.

The storage means 41 is designed to store various data and programs necessary for controlling the engine. As one example of the data, an engine operating region map illustrated in FIG. 4 is stored in the storage means 41. The engine operating region map is designed to define in what kind of modes the engine should be operated depending on the engine speed Ne and an engine load T (required torque).

In the engine operating region map illustrated in FIG. 4, an HCCI (Homogeneous-charge compression ignition) region R is set in a partial-load range of the engine to perform therein HCCI combustion where combustion of an air-fuel mixture formed in each of the cylinders 2 is triggered by auto-ignition. The HCCI region R is divided into two sub-regions Ra, Rb by whether or not internal EGR (Exhaust Gas Recirculation) which is an operation of causing a certain amount of high-temperature exhaust gas to remain inside the cylinder (each of the cylinders 2) is performed therein. In the following description, one of the sub-regions in which the engine load is relatively low, will be referred to as "low load zone Ra", and the other sub-region in which the engine load is relatively high, will be referred to as "high load zone Rb". The internal EGR is performed only in the low load zone Ra without being performed in high load zone Rb. In this embodiment, the internal EGR is performed by opening at least one of the exhaust valves 12 during the intake stroke to cause exhaust gas to flow back into the cylinder 2 from the exhaust port 10, as described later.

The injector control means 42 is designed to control an injection amount and an injection timing of fuel to be injected from the injector 21 into cylinder 2. More specifically, the injector control means 42 is operable to calculate a target fuel injection amount and a target fuel injection timing, based on detection information, such as the engine speed Ne input from the engine speed sensor 30, the accelerator pedal angle AC input from the accelerator-pedal angle sensor 34 and the intake air amount Qa input from the airflow sensor 32, and control a valve-opening timing and a valve-open period of the injector 21, based on a result of the calculation.

Particularly, the injector control means 42 has a function of switching whether a required fuel amount to be injected from the injector 21 (an amount of fuel required for one combustion cycle) is injected at once in a batch manner (all at once) or at a plurality of timings in a split manner, when the engine is operated in the HCCI region R (i.e., in the HCCI combustion mode), depending on a specific condition, for example, whether or not the current engine operation is performed in the low load zone Ra.

When fuel is injected at a plurality of timings in a split manner, a combustion period of an air-fuel mixture becomes longer, and exhaust loss becomes larger, so that it becomes possible to raise an exhaust gas temperature, as compared with cases where all of the fuel is injected during the intake stroke. The injector control means 42 is operable, in an engine operating region where the exhaust gas temperature is likely to becomes lower, such as the low load zone Ra, to execute a split injection mode for injecting fuel in the above manner, according to need, to intentionally raise the exhaust gas temperature. The raising of the exhaust gas temperature is performed to maintain activation of the catalyst 26a. Specifically, purification performance of the catalyst 26a is not exerted without maintaining a temperature of the catalyst 26a at a value higher than a certain level. Thus, in order to prevent deterioration in the purification performance, the split injection mode is executed according to need to achieve the raising of the exhaust gas temperature.

The spark control means 43 is designed to output a power feed signal to the ignition circuit of the spark plug 20 at a given timing preliminary set based on the engine speed Ne and the engine load T to control a timing of a spark discharge (spark timing) of the spark plug 20, etc. However, in this embodiment, the HCCI combustion where an air-fuel mixture is auto-ignited in the cylinder 2 (combustion chamber 6) without relying on spark ignition, is performed at least in the HCCI region R illustrated in FIG. 4. Thus, during a period for performing the HCCI combustion, the spark discharge from the spark plug 20 is fundamentally stopped.

The valve control means 44 is designed to drive the CVVL mechanism 15 to variably set the lift amount of each of the intake valves 22, and simultaneously drive the VVL mechanism 15 to execute or stop the valve-opening operation of each of the exhaust valves 12 during the intake stroke. Particularly, in the HCCI region R, the valve control means 44 has a function of, based on the above control for the intake and exhaust valves 11, 12, adjusting an amount of fresh air to be introduced into each of the cylinders 2, and switching between execution and non-execution of the internal EGR to adjust an in-cylinder temperature.

Specifically, the valve control means 44 is operable, in the HCCI region R, to drive the CVVL mechanism 15 so as to change the lift amount of each of the intake valves 11 to adjust an amount of fresh air to be introduced into the cylinder 2. Simultaneously, the valve control means 44 is operable to drive the VVL mechanism 16 so as to execute or stop the valve-opening operation of each of the exhaust valves 12 during the intake stroke to switch between execution and non-execution of the internal EGR to adjust the in-cylinder temperature. More specifically, in the low load zone Ra in the HCCI region R, based on opening the exhaust valve 12 during the intake stroke, an operation of causing high-temperature exhaust gas to flow back into the cylinder 2 from the exhaust port 10 is executed as the internal EGR. On the other hand, in the high load zone Rb of the HCCI region R, the valve-opening operation of the exhaust valve 12 during the intake stroke is inhibited to keep the backflow of exhaust gas from occurring to stop the internal EGR.

As described above, in the HCCI region R, the amount of fresh air to be introduced into the cylinder 2 (in-cylinder fresh-air amount) is adjusted based on the control for the intake and exhaust valves 11, 12 by the valve control means 44. Thus, it is fundamentally unnecessary to perform a control operation of opening and closing the intake passage 23 by the throttle valve 44, and a degree of opening of the throttle valve 25 is maintained just or approximately in a fully opened state (100%), except in the event of emergency stop of the engine or the like.

A combustion control operation in an engine operation region other than the HCCI region R (low and high load zones Ra, Rb) will be briefly described below. In the following description, the engine operation region other than the HCCI region R, i.e., a region defined by combining an engine speed range on a high engine speed side with respect to the HCCI region R, and an engine load range on a high engine load side with respect to the HCCI region R, will be referred to as "region SR". In the region SR, spark ignition (SI) combustion or HCCI combustion different in methodology from that in the HCCI region R is performed.

For example, in the engine speed range on the high engine speed side with respect to the HCCI region R, a heat receiving period of fuel is short, and thereby it is difficult to induce auto-ignition of an air-fuel mixture. Therefore, the HCCI combustion is switched to a forcible combustion (SI combustion) based on spark discharge using the spark plug 20.

Further, on the high engine load side with respect to the HCCI region R, the HCCI combustion may be switched to the SI combustion in the same manner as the control on the high engine speed side. However, for example, in cases where the engine is a supercharged engine, the HCCI combustion may be continued under a condition that deficiency in the in-cylinder fresh-air amount is corrected by supercharging, while largely shifting the opening timing of the intake valve 11 with respect to a bottom dead center of the intake stroke (intake BDC) to reduce an effective compression ratio of the engine. Specifically, on the high engine load side with respect to the HCCI region R, even if the fuel injection amount is simply increased, abnormal combustion such as preignition is likely to occur. However, based on performing supercharging while reducing the effective compression ratio of the engine, an internal temperature of the combustion chamber 6 around a top dead center of a compression stroke (compression TDC) can be lowered while sufficiently ensure the in-cylinder fresh-air amount. Thus, even on the high engine load side with respect to the HCCI region R, the HCCI combustion can be continued without causing preignition or the like.

However, in the present invention, a combustion control operation to be performed in the region SR other than the HCCI region R is not particularly limited. Thus, in the following description, only a control operation in the HCCI region R will be described.

Figure 6:
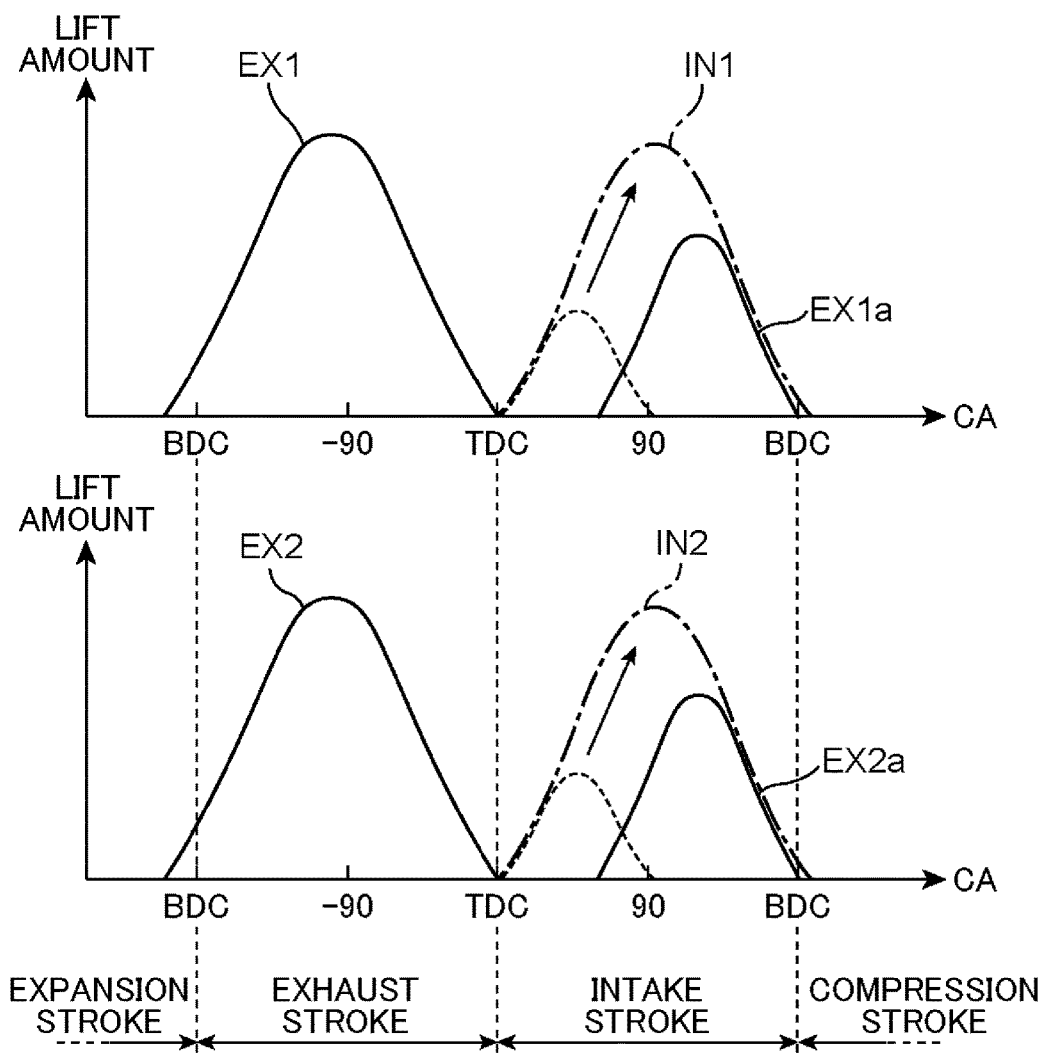
FIG. 6 is a chart illustrating a second opening/closing pattern of an intake/exhaust valve to be executed in the low load zone Ra.
Figure 7:
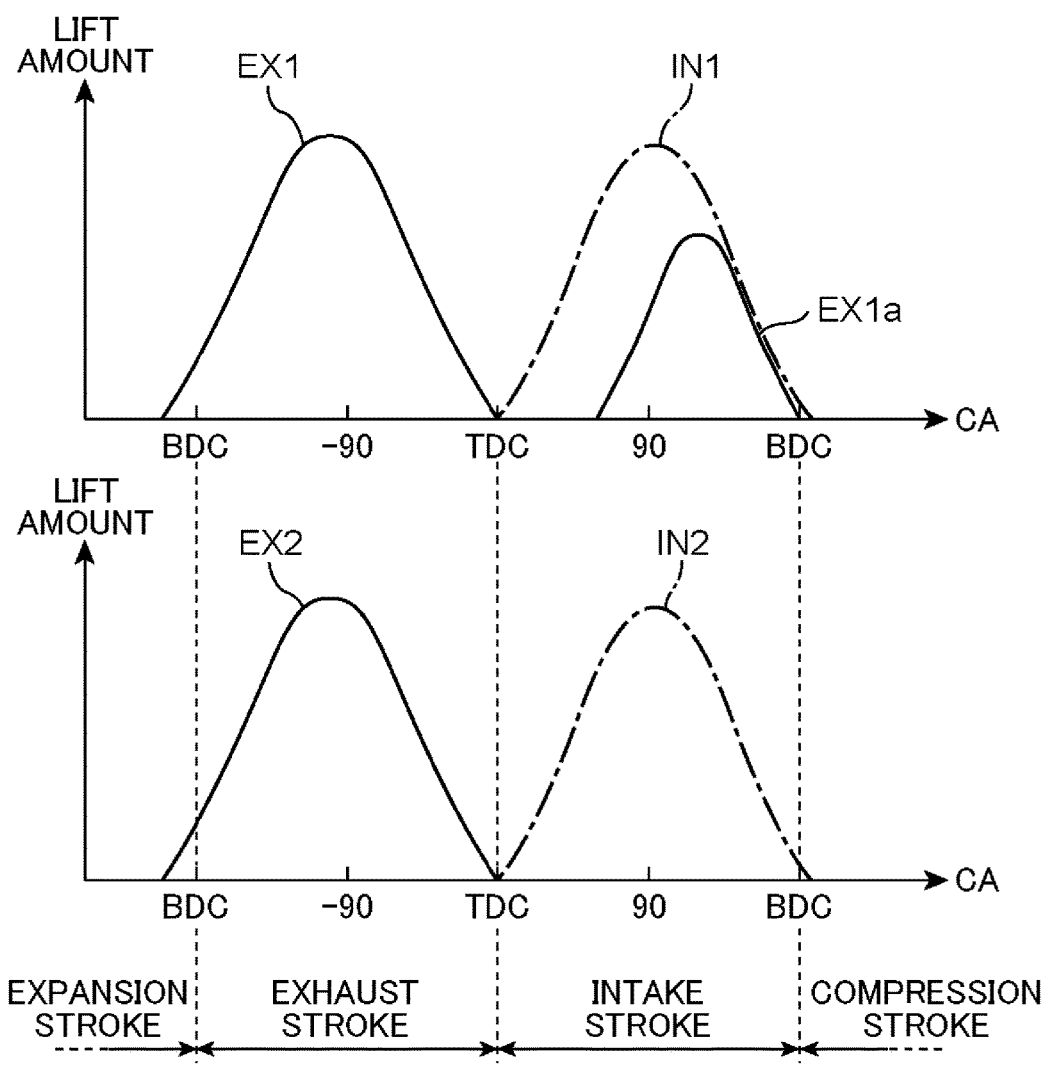
FIG. 7 is a chart illustrating a third opening/closing pattern of an intake/exhaust valve to be executed in the low load zone Ra.
Figure 8:
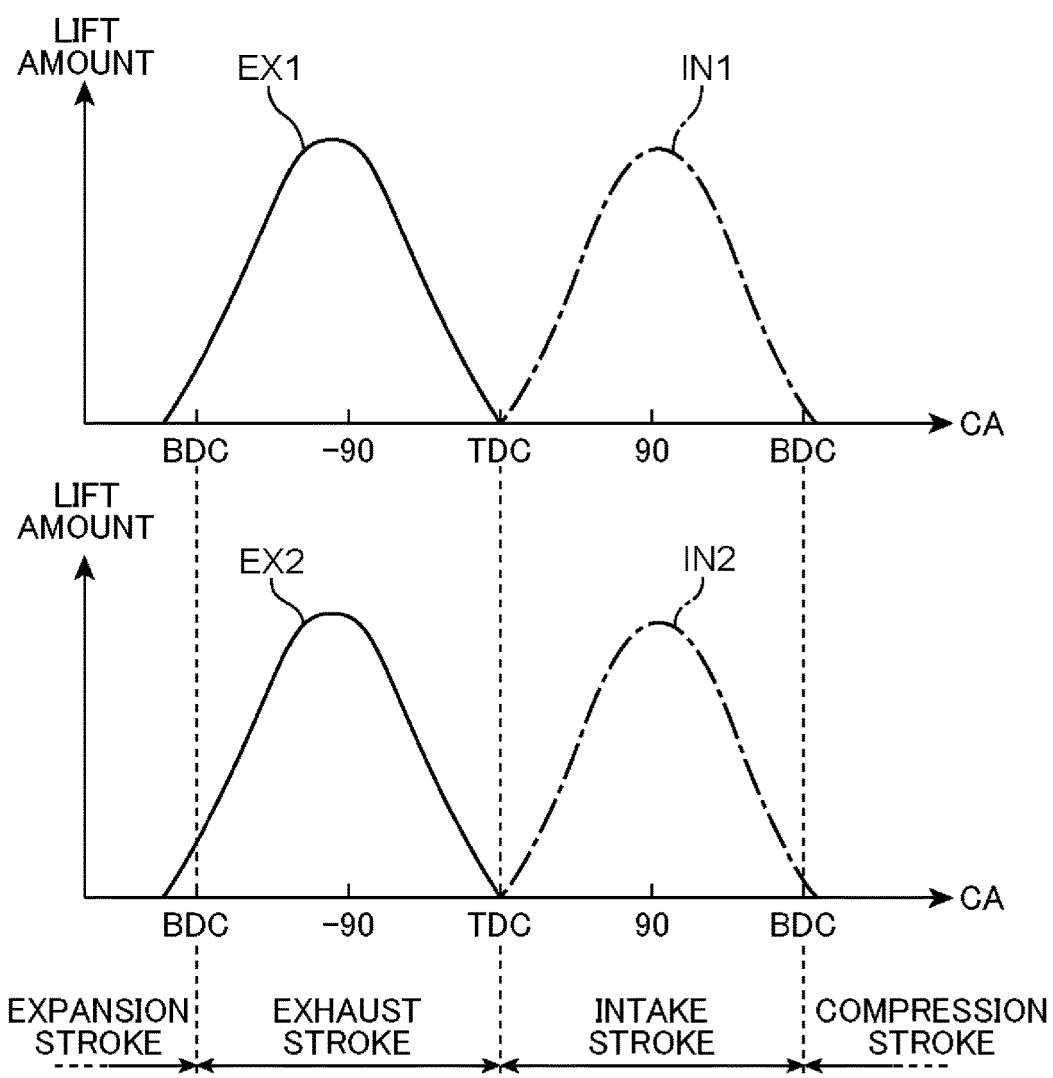
FIG. 8 is a chart illustrating an intake/exhaust valve opening/closing pattern to be executed in a high load zone Rb in FIG. 4.

(3) Control Operation in HCCI Region R (3-1) Control for Intake and Exhaust Valves Firstly, the following description will be made about in what manner the valve control means 44 controls the intake and exhaust valves 11, 12 in the HCCI region R, with reference to FIGS. 5 to 8. Among FIGS. 5 to 8, FIGS. 5 to 7 show opening/closing patterns A1 to A3 of the intake and exhaust valves 11, 12 to be selected in the low load zone Ra of the HCCI region R, and FIG. 8 shows an opening/closing pattern B of the intake and exhaust valves 11, 12 to be selected in the high load zone Rb of the HCCI region R.

In FIGS. 5 to 8, IN1 indicates a lift curve of one of the pair of intake valves 11 provided in each of the cylinders 2, in a state when it is opened during the intake stroke, and IN2 indicates a lift curve of the other intake valve 11 in a state when it is opened during the intake stroke. EX1 indicates a lift curve of one of the pair of exhaust valves 12 provided in each of the cylinders 2, in a state when it is opened during the exhaust stroke, and EX2 indicates a lift curve of the other exhaust valve 12 in a state when it is opened during the exhaust stroke. Further, EX1$a$ indicates a lift curve of the one exhaust valve 12 in a state when it is opened during the intake stroke, and EX2$a$ indicates a lift curve of the other exhaust valve 12 in a state when it is opened during the intake stroke. In FIGS. 5 to 8, the horizontal axis represents a crank angle (CA), wherein TDC is an abbreviation of Top Dead Center, and BDC is an abbreviation of Bottom Dead Center.

Figure 5:
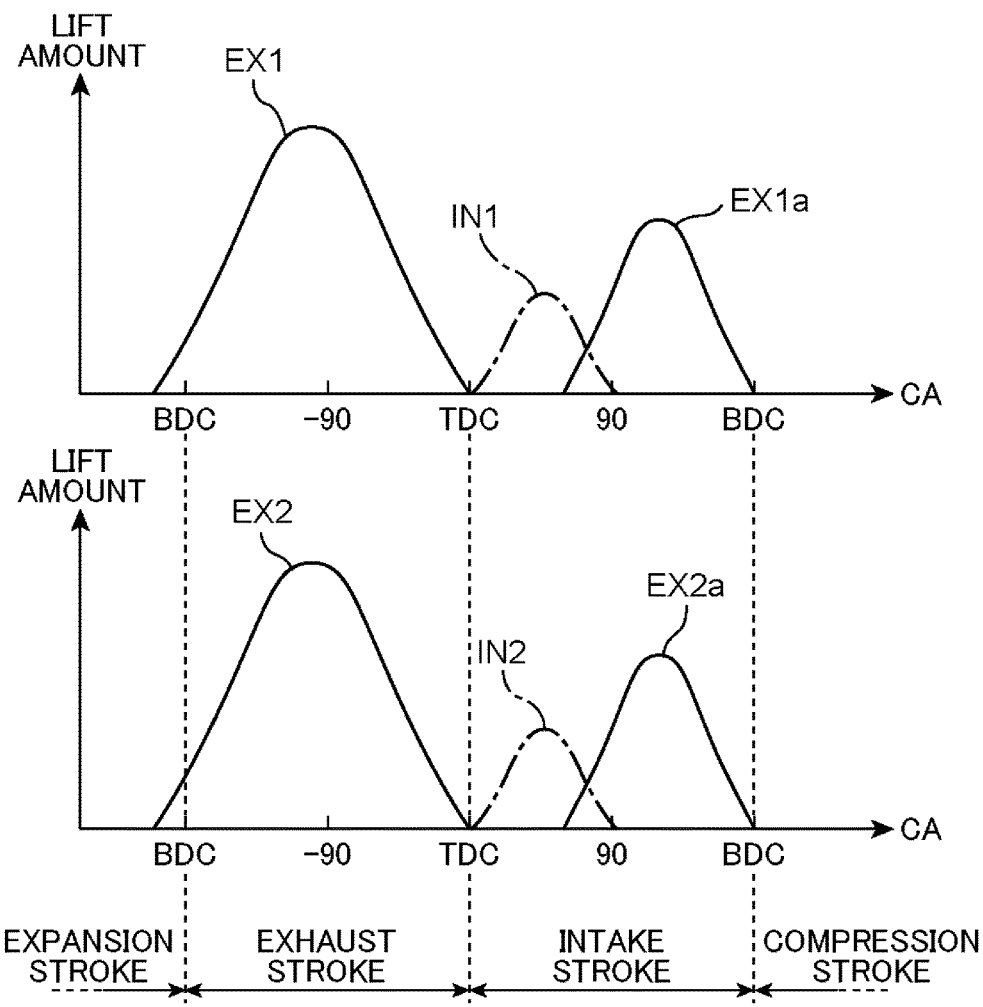
FIG. 5 is a chart illustrating a first opening/closing pattern of an intake/exhaust valve to be executed in a low load zone Ra in FIG. 4.

The opening/closing patterns A1 to A3 to be selected in the low load zone Ra will be specifically described below. As shown in FIGS. 5 to 7, in each of the opening/closing patterns A1 to A3, at least one of the pair of exhaust valves 12 in each of the cylinders 2 is opened during the intake stroke (EX1$a$, EX1$b$) to execute the operation of causing exhaust gas to flow back into the cylinder 2 (internal EGR). Concurrently with the internal EGR, each of the lift amounts (IN1, IN2) of the intake valves 11 is variably set within a given range to adjust an amount of fresh air and an amount of internal EGR gas to be introduced into the cylinder 2.

More specifically, on a lowermost engine load side of the low load zone Ra, the opening/closing patterns A1 (FIG. 5)

is selected. In the opening/closing pattern A1, both of the pair of exhaust valves 12 in each of the cylinders 2 are opened during the exhaust stroke (EX1, EX2), and further opened during the intake stroke (EX1a, EX2a). During this valve-opening operation, both of the pair of intake valves 11 in each of the cylinders 2 are opened during the intake stroke in a relatively small lift amount (IN1, IN2). The valve control means 44 is operable, according to the valve opening/closing pattern set in the above manner, to control the driving of the CVVL mechanism 15 and the VVL mechanism 16.

When the exhaust valves 12 are re-opened during the intake stroke as illustrated in the opening/closing pattern A1, high-temperature exhaust gas discharged from the exhaust port 10 once are returningly introduced into the cylinder 2 (internal EGR). Thus, based on an interaction of the internal EGR and the small lift amount of each of the intake valves 11, the in-cylinder fresh-air amount is significantly reduced, and a rate of exhaust gas flowing back into the cylinder 2 (internal EGR gas) is increased, so that the in-cylinder temperature is significantly raised. This makes it possible to promote auto-ignition of an air-fuel mixture in the cylinder 2 so as to reliably induce the HCCI combustion even in a situation where the engine load is low and thereby the fuel injection amount is small. The introduction of a large amount of internal EGR gas provides an additional advantage of being able to lower an in-cylinder negative pressure so as to reduce pumping loss.

However, if the introduction of a large amount of internal EGR gas is continued to cover the high engine load side, the in-cylinder fresh-air amount becomes deficient, and the auto-ignition of the air-fuel mixture is excessively promoted, which is likely to cause the occurrence of abnormal combustion such as so-called preignition, i.e., a phenomenon that the air-fuel mixture self-ignites at an abnormally early timing. Therefore, in order to avoid such a situation, the opening/closing pattern of the intake and exhaust valves 11, 12 is shifted from the pattern A1 to A2 and A3, in this order along with an increase in the engine load.

When the engine load increases to a value greater than that in the opening/closing pattern A1, and the opening/closing pattern A1 is switched to the opening/closing pattern A2 (FIG. 6), each of the lift amounts (IN1, IN2) of the pair of intake valves 11 in each of the cylinders 2 is set to be greater than that in the opening/closing pattern A1 (FIG. 5). Specifically, the valve control means 44 drives the CVVL mechanism 15 in a direction for causing an increase in lift amount, so that each of the lift amounts of the pair of the intake valves 11 is gradually changed to a larger value as indicated by the arrowed line in FIG. 6. Consequently, an amount of fresh air flowing into the cylinder 2 from the intake ports 9 is increased, and an amount of exhaust gas flowing back into the cylinder 2 (internal EGR gas) is reduced, to lower the in-cylinder temperature.

When the engine load further increases to a value greater than that in the opening/closing pattern A2, and the opening/closing pattern A2 is switched to the opening/closing pattern A3 (FIG. 6), only a first one of the pair of exhaust valves 12 provided in each of the cylinders 2 is opened during the intake stroke, and the other, second, exhaust valve 12 is not opened during the intake stroke. Specifically, the function of driving the VVL mechanism 16 by the valve control means 44 to push down the second exhaust valve 12 during the intake stroke is disenabled, so that the second exhaust valve 12 is opened only during the exhaust stroke (EX2) without being opened during the intake stroke. In contrast, the first exhaust valve 12 is opened both during the exhaust stroke and during the intake stroke (EX1, EX1a). Based on reducing the number of the exhaust valves 12 to be opened per cylinder during the intake stroke, from two to one in the above manner, the amount of internal EGR gas (internal EGR amount) is reduced, and the in-cylinder fresh-air amount is increased.

As above, in the low load zone Ra of the HCCI region R, as a control operation based on the opening/closing patterns A1 to A3, the number of the exhaust valves 12 to be opened during the intake stroke, and the lift amount of each of the intake valves 11, are increased or reduced depending on the engine load to appropriately adjust a ratio between the fresh air and the internal EGR gas. Thus, in the low load zone Ra where the auto-ignition of the air-fuel mixture is originally less likely to occur, the raising of the in-cylinder temperature is achieved at a level suitable for the engine load range in the low load zone Ra to create an adequate in-cylinder environment capable of performing the HCCI combustion.

In this connection, according to a model test carried out by the inventors of the present invention, it has been verified that a ratio of a weight of internal EGR gas to a weight of entire gas (combination of the fresh air and the EGR gas) in the cylinder2, i.e., an internal EGR ratio, is about 80% when the engine is operated in the opening/closing pattern A1. Further, the internal EGR ratio is in the range of about 60 to 70% and in the range of about 40 to 50% when the engine is operated in the opening/closing pattern A2 (wherein the lift amount of each of the intake valves 11 is maximized), and in the opening/closing pattern A3, respectively. In cases where the weight of internal EGR gas is one-half of the weight of fresh air (i.e., in-cylinder fresh-air amount:internal EGR amount=2:1), the internal EGR ratio is 33%. Thus, in the low load zone Ra, internal EGR gas is ensured in an amount equal to or greater than one-half of a weight of fresh air.

Further, in the low load zone Ra, a given amount of fuel is injected from the injector 21 into the cylinder 2 having a mixture of the fresh air and the internal EGR gas introduced therein at the above ratio. In this case, a gas/fuel ratio G/F, i.e., a value derived by dividing the weight of entire gas in the cylinder by the fuel injection amount (a weight of fuel injected into the cylinder in one combustion cycle), is set to a fairly lean value of 60 to 130.

The opening/closing pattern B to be selected in the high load zone Rb of the HCCI region R will be described below. As shown in FIG. 8, in the opening/closing pattern B, the valve-opening operation during the intake stroke is inhibited in both of the pair of exhaust valves 12 provided in each of the cylinder 2. Specifically, the function of driving the VVL 16 by the valve control means 44 to push down the pair of the exhaust valves 12 during the intake stroke is fully disenabled. Consequently, the pair of exhaust valves 12 in each of the cylinders 2 are opened only during the exhaust stroke (EX1, EX2) without being opened during the intake stroke.

Based on zeroing the number of the exhaust valves 12 to be opened per cylinder during the intake stroke, in the above manner, almost no internal EGR gas is introduced into the cylinder 2. Thus, fresh air is ensured in a sufficient amount suitable for the relatively high engine load is ensured, and the in-cylinder temperature is suppressed at a low level to prevent abnormal combustion such as preignition.

Specifically, when the engine load increases to the high load zone Rb, a relatively large amount of fuel is injected from the injector 21, so that the air-fuel mixture is reliably auto-ignited without raising the in-cylinder temperature by the internal EGR. Therefore, the valve-opening operation of the exhaust valves 12 during the intake stroke is inhibited so as to inhibit the introduction of exhaust gas by the internal EGR to prevent the in-cylinder temperature from being excessively raised. This makes it possible to auto-ignite the air-fuel mixture at an adequate timing while injecting a relatively large amount of fuel depending on the engine load.

(3-2) Fuel Injection Control

Figure 9:
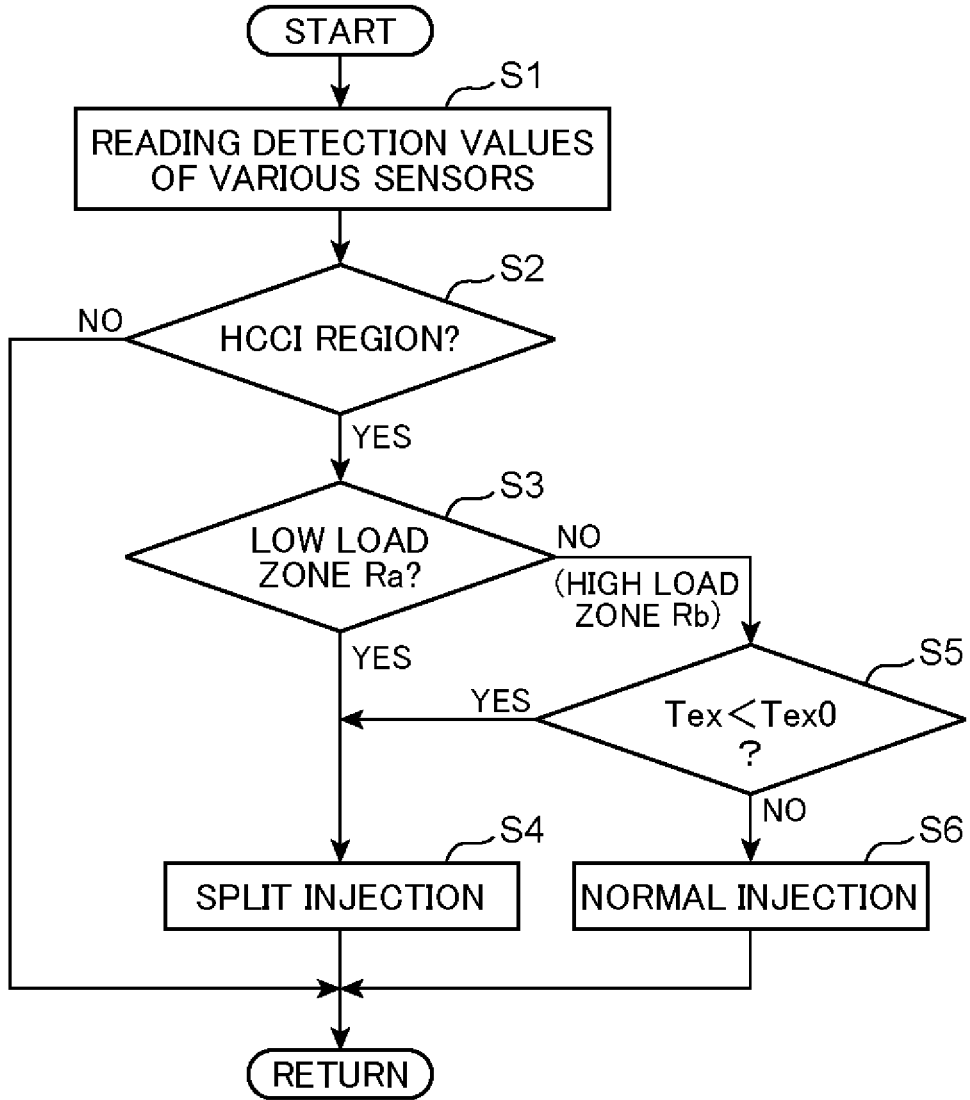
FIG. 9 is a flowchart showing steps of a control operation to be executed in the control system.

The following description will be made about in what manner the fuel injection of the injector 21 is controlled in the HCCI region R. FIG. 9 is a flowchart showing details of a control operation for fuel injection to be executed by the ECU 40. Upon start of a process in the flowchart, the ECU 40 firstly executes a control operation of reading respective detection values of the sensors (Step S1). More specifically, respective values of the engine speed Ne, the in-cylinder pressure Pc, the intake air amount Qa, the exhaust gas temperature Tex and the accelerator-pedal angle AC are read from corresponding ones of the engine speed sensor 30, the in-cylinder pressure sensor 31, the airflow sensor 32, the exhaust gas temperature sensor 33 and the accelerator-pedal angle sensor 34, and input into the ECU 40.

Then, the ECU 40 executes a control operation of determining whether an engine operating point (the engine speed and the engine load) defined based on the information read in the Step S1 falls within the HCCI region R illustrated in FIG. 4 (Step S2). More specifically, it is determined whether both of the value of the engine speed Ne read in the Step S1, and a value of the engine load (required torque) T calculated from the value of the accelerator-pedal angle AC, etc., read in the Step S1, fall within the HCCI region R in FIG. 4.

When the determination in the Step S2 is YES, i.e., it is ascertained that the engine operating point falls within the HCCI region R, the ECU 40 further executes a control operation of determining whether the engine operating point falls within the low load zone Ra of the HCCI region R (Step S3).

When the determination in the Step S3 is YES, i.e., it is ascertained that the engine operating point falls within the low load zone Ra of the HCCI region R, the process advances to Step S4. In the Step S4, the ECU 40 selects a split injection mode for injecting a required fuel amount to be injected from the injector 21 at a plurality of timing in a split manner.

Figure 10:
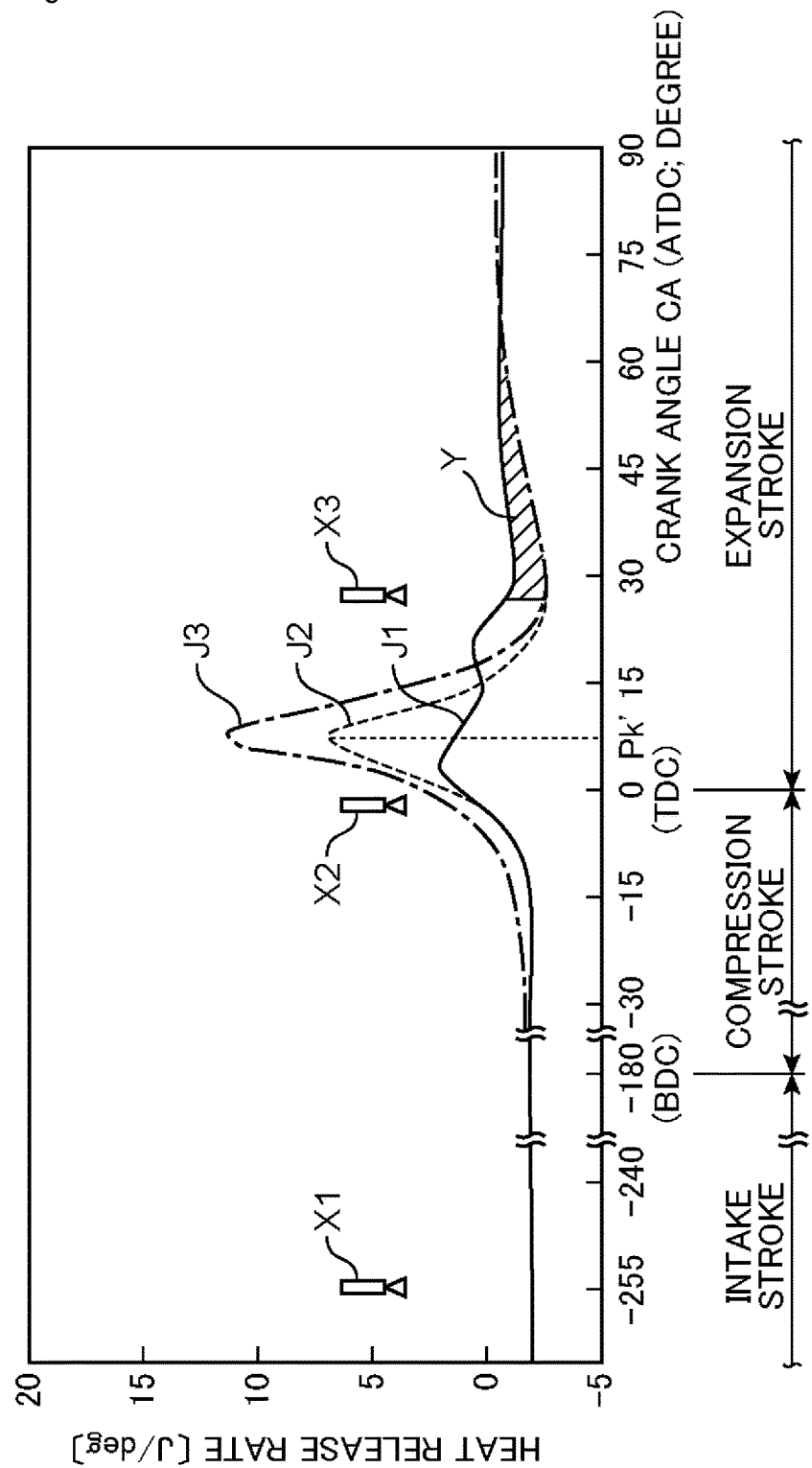
FIG. 10 is a chart showing a timing of fuel injection and a heat release rate RH from combustion based on the fuel injection, in relationship to crank angle.

FIG. 10 is a chart showing a timing of fuel injection and a heat release rate RH from combustion based on the fuel injection, in relationship to crank angle (CA) after the compression TDC (ATDC; degree). FIG. 10 is based on an assumption that the engine operating point is located where the engine speed Ne is 1000 rpm and an indicated mean effective pressure (IMEP), which is an index of the engine load, is 100 kPa. As shown in FIG. 10, in the split injection mode selected in the Step S4, the required fuel amount is injected in a split manner, such that the fuel injection is divided to: a main injection X1 to be initiated a given period before the compression TDC; an auxiliary injection X2 to be initiated at a timing close to the compression TDC; and a post injection X3 to be initiated during a subsequent expansion stroke. The fuel injection amount is distributed to the injections X1 to X3, for example, at the following ratio:main injection X1:auxiliary injection X2:post injection X3=2:1:1. A total injection amounts in the injections X1 to X3, is set to a value which allows the gas/fuel ratio G/F to be in the range of 60 to 130. The injector control means 42 of the ECU 40 is operable, according to setting of the split injection mode, to control the valve-opening timing and the valve-open period of the injector 21.

More specifically, a timing of the main injection X1 is set such that it is initiated during the intake stroke or before an earlier phase of the compression stroke at the latest. In the illustrated embodiment, the timing of the main injection X1 is set to a middle phase of the intake stroke, specifically, 70 to 80 degree CA before the intake BDC. When the main injection X1 is executed at the above timing, fuel injected by the main injection X1 is sufficiently stirred and mixed with in-cylinder gas, in a period from the intake stroke to the compression stroke so that a homogenous air-fuel mixture is formed before the later phase of the compression stroke. Then, the formed homogenous air-fuel mixture is sufficiently raised to a high temperature by an action of compression by the piston 5 and an action of high-temperature exhaust gas introduced by the internal EGR. Thus, the high-temperature air-fuel mixture is auto-ignited around the compression TDC to initiate the HCCI combustion. In the waveform J1 illustrated in FIG. 10, a shape gradually rising just before the compression TDC indicates the initiation of the HCCI combustion. The heat release rate RH before the initiation of the HCCI combustion is lower than zero, because a value corresponding to cooling loss is subtracted therefrom.

When the HCCI combustion based on the main injection X1 is initated, and the heat release rate RH starts increasing, the auxiliary injection X2 is initiated at this timing. Then, the in-cylinder temperature is lowered due to latent heat of vaporization of fuel injected by the auxiliary injection X2 to suppress a progress of the combustion, so that, after the auxiliary injection X2, the heat release rate RH turns into lowering once. In this manner, a peak value of the heat release rate RH is suppressed, and a combustion velocity becomes slower.

In FIG. 10, the waveform J2 indicates a change in the heat release rate RH arising from the combustion based on the main injection X1 on an assumption that the auxiliary injection X2 is not executed. As seen in the waveform J2, the heat release rate RH rises up to a value greater than that in the waveform J1 obtained when the auxiliary injection X2 is executed. Further, given that a timing when the waveform J2 has a peak value is Pk', the timing Pk' is a timing of the emergence of a peak value of the heat release rate on an assumption that the auxiliary injection X2 is not executed. The timing Pk' will hereinafter be referred to as "assumed peak timing Pk'".

The initiation timing of the auxiliary injection X2 is set to a point before the assumed peak timing Pk'. Based on initiating the auxiliary injection X2 at this timing, the progress of the combustion based on the main injection X1 is suppressed by the latent heat of vaporization from the auxiliary injection X2 before the heat release rate RH from the combustion based on the main injection X1 has a peak value, so that the peak value of the heat release rate RH is lowered, as compared with that of the waveform J2 on the assumption that the auxiliary injection X2 is not executed. Thus, relatively slow combustion will continuously progress (slowing of combustion), so that a combustion period is extended.

The initiation timing of the auxiliary injection X2 to be set at a point before the assumed peak timing Pk' in the above manner is specified based on a value of the in-cylinder pressure Pc detected by the in-cylinder pressure sensor 31. Specifically, when the heat release rate RH is increased, the in-cylinder pressure Pc is raised accordingly, so that the initiation timing of the auxiliary injection X2 can be determined based on how much the in-cylinder pressure Pc is raised.

For example, the auxiliary injection X2 is initiated at a timing when a rising amount of the in-cylinder pressure Pc from a certain reference value (such as an average value of in-cylinder pressures in a period other than the combustion period) becomes greater than a predetermined given value. In this operation, a threshold value for the rising amount of the in-cylinder pressure Pc may be set to be less than a rising amount corresponding to a peak of the heat release rate RH (peak of the waveform J2) to be obtained on the assumption that the auxiliary injection X2 is not executed, so that the auxiliary injection X2 can be initiated a certain period before the assumed peak timing Pk'. More specifically, it is preferable that the threshold value for the in-cylinder pressure Pc is set to allow the auxiliary injection X2 to be initiated at a timing when 10 to 30% by mass of the fuel injected by the main injection X1 is combusted. In the illustrated embodiment, the auxiliary injection X2 is initiated at a timing just before the compression TDC.

After the auxiliary injection X2 is executed at the above timing, in a period of duration of the successive combustion, the post injection X3 is executed. An initiation timing of the post injection X3 is set to a point after the assumed peak timing Pk' and before the fuel injected by the main injection X1 and the auxiliary injection X2 is completely combusted out. Based on initiating the post injection X3 at the above timing, combustion based on the post injection X3 is produced, following the combustion based on the main injection X1 and the auxiliary injection X2, so that the combustion period is further extended.

In order to set the above timing (just before the combustion based on the main injection X1 and the auxiliary injection X2 is completed) as the initiation timing of the post injection X3, a crank angle after the timing of the auxiliary injection X2 suitable as the initiation timing of the post injection X3 may be experimentally obtained. In the conditions (Ne=1000 rpm, IMEP=100 kPa) in FIG. 10, the post injection X3 is initiated at a timing of about 30 degrees CA after the timing of the auxiliary injection X2. As long as the engine operating point falls within the low load zone Ra of the HCCI region R, the suitable timing does not largely vary from this timing. Thus, the post injection X3 is generally executed at a timing of 25 to 30 degrees CA after the timing of the auxiliary injection X2.

As above, based on injecting the required fuel amount in a split manner at three timings corresponding to the main injection X1, the auxiliary injection X2 and the post injection X3, combustion can be slowed to extend the combustion period, as shown in the waveform J1. For example, the waveform J3 illustrated together with the waveform J1 indicates a waveform obtained when all of a total fuel injection amount of the three injections X1 to X3 is injected at the same timing as that of the main injection X1. As seen in the waveform J3, when all of the required fuel is injected during the intake stroke, the heat release rate RH rapidly rises just after the air-fuel mixture starts being auto-ignited, and quickly reaches to a peak value, so that the combustion period becomes fairly short.

In contrast, in the waveform J1 where the required fuel amount is injected in a split manner at three timings, the peak value of the heat release rate RH is significantly lowered, and the combustion period becomes longer accordingly. The extension of the combustion period causes an increase in the exhaust loss which leads to an increase in the exhaust gas temperature.

For example, in FIG. 10, the heat release rate RH in cases where the required fuel amount is injected in a batch manner (waveform J3), reaches a lowest point slightly before 30 degrees CA after the compression TDC (30 degrees CA ATDC). This shows that HCCI combustion in cases where the required fuel amount is injected in a batch manner, is completed slightly before 30 degrees CA ATDC.

In contrast, when the required fuel amount is injected in a split manner (waveform J1), a heat release is observed over a certain period, even after a completion timing of the combustion based on the batch injection (about 30 degrees CA ATDC), as indicated by the hatched area Y in FIG. 10. Based on allowing the heat release to continue until a later timing during the expansion stroke, a rate of lost heat included in exhaust gas (exhaust loss) is increased, and consequently the exhaust gas temperature is raised. Even if the exhaust loss is intentionally increased by the split injection, the combustion period is sufficiently short as compared with the SI combustion, which is advantageous in terms of thermal efficiency.

As above, when the engine is operated in the low load zone Ra of the HCCI region R, the required fuel amount is injected in a split manner at three timings corresponding to the main injection X1, the auxiliary injection X2 and the post injection X3, to intentionally raise the exhaust gas temperature. Thus, the exhaust gas temperature can be maintained at a relatively high value even in the low load zone Ra where the engine load is low and thereby the fuel injection amount is small, so that it becomes possible to prevent the temperature of the catalyst 26a provided in the exhaust passage 24 from being excessively lowered.

Returning to FIG. 9, a control operation to be performed when the determination in the Step S3 is NO, i.e., when the engine is operated in the high load zone Rb of the HCCI region R, will be described. In this case, the ECU executes a control operation of determining whether a detection value of the exhaust gas temperature Tex read from the exhaust gas temperature sensor 33 in the Step S1 is less than a predetermined threshold value Tex0 (Step S5).

When the determination in the Step S5 is YES, i.e., it is ascertained that the value of the exhaust gas temperature Tex is less than the threshold value Tex0, the process advances to the Step S4, wherein the split injection mode for injecting fuel in a split manner at the timings of the main injection X1, the auxiliary injection X2 and the post injection X3, is selected in the same manner as that in FIG. 10.

On the other hand, when the determination in the Step S5 is NO, i.e., it is ascertained that the value of the exhaust gas temperature Tex is equal to or greater than the threshold value Tex0, the process advances to Step S6. In the Step S6, the ECU 40 selects a normal injection mode for inject all of the required fuel amount from the injector 21 in a batch manner. Specifically, all of the required fuel amount is injected at the timing of the main injection X1 set within the intake stroke. Combustion based on the normal injection mode has a high peak value of the heat release rate RH, and a short combustion period. In other words, most of the fuel is combusted around the compression TDC, and thereby low exhaust loss and higher thermal efficiency are obtained.

(4) Functions/Effects

As described above, in the above embodiment, in the gasoline engine equipped with the catalyst 26a for purifying exhaust gas, the HCCI combustion is performed in the HCCI region R which is an engine operating region set in a partial-load range of the engine, and in the low load zone Ra as a part of the HCCI region R on a low engine load side, the HCCI combustion is performed while enhancing auto-ignitability of an air-fuel mixture by internal EGR. Further, when the engine is operated in the low load zone Ra (when the determination in the Step S3 illustrated in FIG. 9 is YES), the required fuel amount to be injected from the injector 21 is injected in a split manner, such that the fuel injection is divided to: the main injection X1 to be initiated a given period before the compression TDC; the auxiliary injection X2 to be initiated after initiation of auto-ignited combustion of an air-fuel mixture consisting of air and the fuel injected by the main injection X1 and before the assumed peak timing Pk' of the heat release rate RH from the combustion based on the main injection X1; and the post injection X2 to be initiated after the assumed peak timing Pk' and before completion of combustion based on the main injection X1 and the auxiliary injection X2, as shown in FIG. 10. This feature has an advantage of being able to effectively prevent deterioration in performance of the catalyst 26a due to excessive lowering of the exhaust gas temperature, while sufficiently ensuring auto-ignitability and fuel economy performance.

Specifically, in the low load zone Ra where the engine load is low and thereby the fuel injection amount is small, the HCCI combustion is performed under a fairly lean environment (in the above embodiment, the gas/fuel ratio G/F=60 to 130), while ensuring auto-ignitability by the internal EGR, so that a combustion temperature is originally not so high. Therefore, if the required fuel amount is injected in a batch manner, combustion having low exhaust loss and a short combustion period is produced, and thereby the exhaust gas temperature is fairly lowered, which is liable to cause deterioration in activation of the catalyst 26a.

For example, in a test carried out by the inventors, it has been verified that, when the required fuel amount is injected in a batch manner under the condition that the engine speed Ne is 1000 rpm, and the IMEP (Indicated Mean Effective Pressure) is 100 kPa, the exhaust gas temperature upstream of the catalyst 26a (a detection value of the exhaust gas temperature Tex from the exhaust gas temperature sensor 33) is raised up to only about 100 Celcius degrees.

In contrast, in the above embodiment, when the engine is operated in the low load zone Ra, the required fuel amount is injected in a split manner at the timings of the main injection X1, the auxiliary injection X2 and the post injection X3, so that the exhaust gas temperature is intentionally raised. This makes it possible to effectively prevent lowering of the temperature of the catalyst 26a so as to adequately maintain purification performance of the catalyst 26a.

More specifically, based on initiating the main injection X1 a given period before the compression TDC (in the above embodiment, in the middle phase of the intake stroke), the injected fuel can be sufficiently stirred to form a homogenous air-fuel mixture to allow the HCCI combustion to be reliably produced in the cylinder 2 raised to a high temperature by the internal EGR. Further, based on initiating the auxiliary injection X2 before the assumed peak timing Pk' of the heat release rate RH from the combustion based on the main injection X1, the progress of the combustion can be suppressed by means of the latent heat of vaporization of the fuel injected by the auxiliary injection X2, in a relatively early stage of the combustion based on the main injection X1, to extend the combustion period. Then, based on initiating the post injection X3 before completion of the combustion based on the main injection X1 and the auxiliary injection X2, combustion of the fuel injected by the post injection X3 can be produced, following the combustion based on the main injection X1 and the auxiliary injection X2, to further extend the combustion period, while effectively preventing the fuel by the post injection X3 from being discharged outside in an un-combusted state.

In addition, based on injecting the required fuel amount in a split manner at the above particular timings of the main injection X1, the auxiliary injection X2 and the post injection X3, the combustion can be slowed to extend the combustion period, while reliably combusting most of the injected fuel within the cylinder 2, so as to achieve a rise in the exhaust gas temperature. This makes it possible to satisfy both the requirements of ensuring auto-ignitability and the fuel economy performance, and maintaining the performance of the catalyst 26a.

In a test carried out by the inventors, it has been verified that, when the split injection based on the main injection X1, the auxiliary injection X2 and the post injection X3 is performed under the condition that the engine speed Ne is 1000 rpm, and the IMEP (Indicated Mean Effective Pressure) is 100 kPa, the exhaust gas temperature upstream of the catalyst 26a (a detection value Tex from the exhaust gas temperature sensor 33) is raised up to about 200 Celcius degrees. This temperature of 200 Celcius degrees is a value which allows a catalyst to exert sufficient purification performance, as long as the catalyst a low-temperature type capable of being activated even at a relatively low temperature. Thus, it is believed that the catalyst 26a can be constantly maintained in an activated state by employing the low-temperature catalyst as the catalyst 26a, and raising the exhaust gas temperature in the low load zone Ra by means of the split injection.

However, the capability of raising the exhaust gas temperature to about 200 Celcius degrees is exhibited just in the severe condition that the engine speed Ne is 1000 rpm, and the IMEP is 100 kPa, and it is understood that the exhaust gas temperature can be raised to a value greater than 200 Celcius degrees, in an engine operating region on a high engine speed side or a high engine load side with respect to the above condition. Further, the catalyst 26a has a certain level of temperature-keeping ability. Thus, it would be quite rare that the temperature of the catalyst 26a is actually lowered to about 200 Celcius degrees. Thus, as the catalyst 26a, the low-temperature catalyst is not necessarily employed, but a conventional three-way catalyst may be employed.

In the above embodiment, when a detection value of the exhaust gas temperature Tex on the upstream side of the catalyst 26a is less than the threshold value Tex0 (when the determination in Step S5 is YES), the split injection based on the main injection X1, the auxiliary injection X2 and the post injection X3 is executed, even if the engine is not operated in the low load zone Ra of the HCCI region R. According to this feature, in cases where the purification performance of the catalyst 26a is likely to deteriorate due to lowering of the exhaust gas temperature, the split injection can be performed to raise the exhaust gas temperature so as to reliably maintain the performance of the catalyst 26a.

For example, even in cases where the engine is operated in the high load zone Rb of the HCCI region R, when a value of the engine load is close to that in the low load zone Ra, and the engine speed Ne is fairly low, a detection value of the exhaust gas temperature Tex is likely to fail to significantly rise and become less than the threshold value Tex0. In such a situation, the split injection can be executed to raise the exhaust gas temperature so as to sufficiently ensure the performance of the catalyst 26a.

In the above embodiment, as shown in FIG. 10, when the split injection mode is selected, the main injection X1 is executed only once in the middle phase of the intake stroke. However, the number of injection timings of the main injection X1 is not necessarily set to one. For example, the fuel for the main injection X1 may be injected in a split manner at a plurality of timings in a period between the intake stroke and the earlier phase of the compression stroke.

In the above embodiment, the internal EGR is achieved by opening at least one of the exhaust valves 12 during the intake stroke to cause high-temperature exhaust gas to flow back into the cylinder 2 from the exhaust port 10. Alternatively, the internal EGR may be performed by providing a period where both the intake valve 11 and the exhaust valve 12 are closed, between a halfway point of the exhaust stroke and a halfway point of the intake stroke, so-called "negative overlap period".

More specifically, a variable timing mechanism is associated with the intake and exhaust valves 11, 12 in each of the cylinders 2 to change respective operation timings thereof, and driven in such a manner that a closing timing of the exhaust valve 12 and an opening timing of the intake valve 11 are set to respective points offset from each other by a given period across the exhaust TDC. In this manner, the negative overlap period can be created. In a state when the negative overlap period exists in the engine, the cylinder 2 is placed in a hermetically closed state from the halfway point of the exhaust stroke, and thereby a part of exhaust gas produced in the cylinder 2 remains in the cylinder 2, so that the internal EGR is achieved.

In the above embodiment, when the engine is operated in the low load zone Ra of the HCCI region R, the split injection (control operation of injecting fuel in a split manner at the timings of the main injection X1, the auxiliary injection X2 and the post injection X3, as shown in FIG. 10) is executed without exception, and, when the engine is not operated in the low load zone Ra (i.e., the engine is operated in the high load zone Rb), the split injection is also executed if a detection value of the exhaust gas temperature Tex is less than the threshold value Tex0. Alternatively, the ECU 40 may be configured to execute only one of the determination on whether the engine is operated in the low load zone Ra (Step S3) and the determination on whether a detection value of the exhaust gas temperature Tex is less than the threshold value Tex0 (Step S5), and select whether or not the split injection is executed, based on a result of the executed determination.

As for a criterion for performing the selection on whether or not the split injection is executed, various techniques other than the determination technique described in the above embodiment are contemplated. A specific example thereof will be described below as other embodiments.

(5) Other Embodiments

When a deceleration fuel cut-off mode for stopping a supply of fuel during vehicle deceleration (when an angle of the accelerator pedal is zero and a vehicle speed is equal to or greater than a given value) is executed for a long period of time, only air will continuously passes through the exhaust passage 24 for a long period of time, which is likely to cause lowering of the temperature of the catalyst 26a. As measures against this problem, it is contemplated that the split injection is essentially executed when the fuel injection is restarted after the deceleration fuel cut-off mode is continued for a given period of time, to raise the exhaust gas temperature. This makes it possible to quickly raise the temperature of the catalyst 26a even if it is lowered due to the long period of fuel cut-off.

The split injection may also be executed when an engine coolant temperature is less than a given value. Specifically, when the engine coolant temperature is low, the in-cylinder temperature is likely to fail to rise to a value enough to auto-ignite the air-fuel mixture, resulting in the occurrence of misfire or the like, and a vehicle heater for warming up an passenger compartment by means of heat exchange with engine coolant is likely to fail to sufficiently function. As measures against these problems, when the engine coolant temperature is less than a given value, the split injection may be executed to increase an amount of heat to be absorbed by the engine body 1 so as to raise the engine coolant temperature. This makes it possible to stabilize the HCCI combustion, and effectively prevent deterioration in performance of the vehicle heater.

(6) Outline

An outline of features and effects of the present invention disclosed based on the above embodiments will be described below.

A gasoline engine employing a gasoline engine control system of the present invention is provided with an injector for injecting fuel at least partially consisting of gasoline, into a cylinder, and designed such that a homogeneous-charge compression ignition (HCCI) combustion, in which an air-fuel mixture consisting of air and the fuel injected from the injector is compressed by a piston and auto-ignited, is performed in an HCCI region including at least a partial-load range of the engine, and internal EGR is performed in a part of the HCCI region on a low engine load side. The gasoline engine control system comprises an injector controller adapted to control an injection amount and an injection timing of the fuel from the injector, wherein the injector controller is operable, when a specific condition requiring a rise in exhaust gas temperature is satisfied during an engine operation in the HCCI region, to inject a required fuel amount to be injected from the injector in a split manner, such that the fuel injection is divided to: a main injection to be initiated a given period before a compression top dead center; an auxiliary injection to be initiated after initiation of auto-ignited combustion of an air-fuel mixture consisting of air and the fuel injected by the main injection and before an assumed peak timing of a heat release rate from the combustion based on the main injection; and a post injection to be initiated after the assumed peak timing and before completion of combustion based on the main injection and the auxiliary injection.

In cases where it is attempted to promote HCCI combustion in a part of the HCCI region by means of the internal EGR as in the gasoline engine of the present invention, the highly efficient HCCI combustion becomes executable in a wide engine operation region including a low engine load range where the fuel injection amount is small. Thus, there is concern that an exhaust gas temperature is excessively lowered. In order to cope with the above problem, in the present invention, a split injection based on the main injection, the auxiliary injection and the post injection is executed as measures for raising the exhaust temperature. This has an advantage of being able to effectively raising the exhaust temperature while sufficiently ensuring auto-ignitability and fuel economy performance.

More specifically, based on initiating the main injection a given period before the compression top dead center (TDC), the injected fuel can be sufficiently stirred to form a homogenous air-fuel mixture to allow the HCCI combustion to be reliably produced. Further, based on initiating the auxiliary injection before the assumed peak timing of the heat release rate from the combustion based on the main injection, a progress of the combustion can be suppressed by means of latent heat of vaporization of the fuel injected by the auxiliary injection X1, in a relatively early stage of the combustion, to extend a combustion period. Then, based on initiating the post injection before completion of the combustion based on the main injection and the auxiliary injection, combustion of the fuel injected by the post injection can be produced, following the combustion based on the main injection and the auxiliary injection, to further extend the combustion period, while effectively preventing the fuel by the post injection from being discharged outside in an un-combusted state.

In addition, based on injecting the required fuel amount in a split manner at the particular timings of the main injection, the auxiliary injection and the post injection, the combustion can be slowed to extend the combustion period, while reliably combusting most of the injected fuel within the cylinder. This makes it possible to satisfy both the requirements of ensuring auto-ignitability and the fuel economy performance, and raising the exhaust gas temperature.

In cases where the gasoline engine has an exhaust passage provided with a catalyst for purifying exhaust gas, it is preferable that the specific condition is a condition which is satisfied when it is determined that the rise in exhaust gas temperature is required to maintain activation of the catalyst.

According to this feature, when it is determined that the rise in exhaust gas temperature is required to maintain activation of the catalyst, a control operation of injecting fuel in a split manner at the timings of the main injection, the auxiliary injection and the post injection is executed. In this manner, the exhaust gas temperature is controlled in view of maintaining activation of the catalyst. This makes it possible to reliably maintain a state in which the purification performance of the catalyst is sufficiently exerted.

For example, in an engine operating zone of the HCCI region where the internal EGR is performed, a fairly small amount of fuel is combusted in the HCCI combustion mode, while ensuring auto-ignitability by the internal EGR, so that the exhaust gas temperature is more likely to be lowered, which is liable to cause deterioration in activation of the catalyst. Therefore, the specific condition may be set as a condition which is satisfied when the gasoline engine is operated in the part of the HCCI region where the internal EGR is performed. Specifically, when the gasoline engine is operated in the part of the HCCI region where the internal EGR is performed, the control operation of injecting fuel in a split manner at the timings of the main injection, the auxiliary injection and the post injection is executed.

The system may be configured, in the part of the HCCI region where the internal EGR is performed, to ensure internal EGR gas in an amount equal to or greater than one-half of a weight of fresh air, and set a gas/fuel ratio to be in the range of 60 to 130, where the gas/fuel ratio is a value derived by dividing a weight of entire gas in the cylinder by a weight of the fuel injected into the cylinder.

According to this feature, a relatively large amount of internal EGR gas which is equal to or greater than one-half of the weight of fresh air is ensured by the internal EGR, so that it becomes possible to further raise an in-cylinder temperature so as to effectively promote the HCCI combustion. In addition, even if a fairly lean environment having a gas/fuel ratio of 60 to 130 is created in the cylinder as a result of performing the internal EGR to introduce a large amount of internal EGR gas, the exhaust gas temperature can be raised by the split injection. This makes it possible to effectively raise a temperature of the catalyst so as to maintain the performance of the catalyst.

In view of maintaining activation of the catalyst, the specific condition may also be set as a condition which is satisfied when the exhaust gas temperature is less than a predetermined value.

According to this feature, when the exhaust gas temperature is less than a predetermined value, the control operation of injecting fuel in a split manner at the timings of the main injection, the auxiliary injection and the post injection is executed. In this case, based on a level of the exhaust gas temperature directly related to the temperature of the catalyst, the exhaust gas temperature is controllably raised by the split injection. This has an advantage of being able to reliably maintain the purification performance of the catalyst.

Alternatively, the specific condition may be set as a condition which is satisfied when the fuel injection is restarted after a deceleration fuel cut-off mode is continued for a predetermined time or more.

According to this feature, when the fuel injection is restarted after the deceleration fuel cut-off mode is continued for a predetermined time or more, the control operation of injecting fuel in a split manner at the timings of the main injection, the auxiliary injection and the post injection is executed. This makes it possible to quickly raise the temperature of the catalyst even if it is lowered due to the long period of fuel cut-off.

The purpose of the split injection is not limited to maintaining activation of the catalyst. For example, the specific condition may be set as a condition which is satisfied when an engine coolant temperature is less than a predetermined value.

According to this feature, when the engine coolant temperature is less than a predetermined value, the control operation of injecting fuel in a split manner at the timings of the main injection, the auxiliary injection and the post injection is executed. In this case, when the engine coolant temperature is low, the split injection is executed to extend a combustion period, so that it becomes possible to increase an amount of heat to be absorbed by an engine body so as to raise the engine coolant temperature. This makes it possible to stabilize the HCCI combustion, and effectively prevent deterioration in performance of a vehicle heater.

In the present invention, the main injection may be executed in such a manner as to inject the fuel in a split manner at plurality of timings in a period from an intake stroke to an earlier phase of a subsequent compression stroke.

This application is based on Japanese Patent application No. 2010-082554 filed in Japan Patent Office on Mar. 31, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:
1. A system for controlling a gasoline engine which is provided with an injector for injecting fuel at least partially consisting of gasoline, into a cylinder, and designed such that a homogeneous-charge compression ignition combus- tion, in which an air-fuel mixture consisting of air and the fuel injected from the injector is compressed by a piston and auto-ignited, is performed in an HCCI region including at least a partial-load range of the engine, and internal EGR is performed in a part of the HCCI region on a low engine load side, the system comprising an injector controller configured to control an injection amount and an injection timing of the fuel from the injector, and an in-cylinder pressure sensor configured to detect an in-cylinder pressure which is an internal pressure of the cylinder and to output the detected in-cylinder pressure to the injector controller, wherein the injector controller is configured, when a specific condition requiring a rise in exhaust gas temperature is satisfied during an engine operation in the HCCI region, to inject a required fuel amount to be injected from the injector in a split manner, such that the fuel injection is divided to: a main injection to be initiated a given period before a compression top dead center; an auxiliary injection to be initiated after initiation of auto-ignited combustion of an air-fuel mixture consisting of air and the fuel injected by the main injection and before an assumed peak timing of a heat release rate from the combustion based on the main injection; and a post injection to be initiated after the assumed peak timing and before completion of combustion based on the main injection and the auxiliary injection, wherein the injector controller is configured to obtain the in-cylinder pressure, which is raised according to the combustion based on the main injection, from the in-cylinder pressure sensor, and is configured to determine the initiation timing of the auxiliary injection based on when a rising amount of the in-cylinder pressure becomes greater than a predetermined given value, and wherein the system is configured to ensure internal EGR gas in an amount equal to or greater than one-half of a weight of fresh air, and set a gas/fuel ratio to be in the range of 60 to 130, where the gas/fuel ratio is a value derived by dividing a weight of entire gas in the cylinder by a weight of the fuel injected into the cylinder.

2. The system as defined in claim 1, wherein:
the gasoline engine has an exhaust passage provided with a catalyst for purifying exhaust gas; and
the specific condition is a condition which is satisfied when it is determined that the rise in exhaust gas temperature is required to maintain activation of the catalyst.

3. The system as defined in claim 2, wherein the specific condition is a condition which is satisfied when the gasoline engine is operated in the part of the HCCI region where the internal EGR is performed.

4. The system as defined in claim 2, wherein the specific condition is a condition which is satisfied when the exhaust gas temperature is less than a predetermined value.

5. The system as defined in claim 2, wherein the specific condition is a condition which is satisfied when the fuel injection is restarted after a deceleration fuel cut-off mode is continued for a predetermined time or more.

6. The system as defined in claim 1, wherein the specific condition is a condition which is satisfied when an engine coolant temperature is less than a predetermined value.

7. The system as defined in claim 1, wherein the main injection is executed in such a manner as to inject the fuel in a split manner at plurality of timings in a period from an intake stroke to an earlier phase of a subsequent compression stroke.

* * * * *